(12) United States Patent
Lyons

(10) Patent No.: US 10,951,695 B2
(45) Date of Patent: Mar. 16, 2021

(54) SYSTEM AND METHODS FOR IDENTIFICATION OF PEER ENTITIES

(71) Applicant: AON GLOBAL OPERATIONS LTD (SINGAPORE BRANCH), Singapore (SG)

(72) Inventor: Oisin Lyons, Dublin (IE)

(73) Assignee: AON GLOBAL OPERATIONS SE SINGAPORE BRANCH, Singapore (SG)

(*) Notice: Subject to any disclaimer, the term of this patent is extended or adjusted under 35 U.S.C. 154(b) by 0 days.

(21) Appl. No.: 16/789,140

(22) Filed: Feb. 12, 2020

(65) Prior Publication Data

US 2020/0267209 A1    Aug. 20, 2020

Related U.S. Application Data

(60) Provisional application No. 62/805,594, filed on Feb. 14, 2019.

(51) Int. Cl.
| | |
|---|---|
| *G06F 17/18* | (2006.01) |
| *G06N 20/20* | (2019.01) |
| *H04L 29/08* | (2006.01) |
| *G06F 16/9535* | (2019.01) |
| *G06K 9/20* | (2006.01) |
| *G06K 9/62* | (2006.01) |
| *H04L 12/24* | (2006.01) |

(52) U.S. Cl.
CPC ........ *H04L 67/104* (2013.01); *G06F 16/9535* (2019.01); *G06K 9/2054* (2013.01); *G06K 9/6276* (2013.01); *H04L 41/12* (2013.01); *H04L 67/025* (2013.01)

(58) Field of Classification Search
None
See application file for complete search history.

(56) References Cited

U.S. PATENT DOCUMENTS

| | | | |
|---|---|---|---|
| 5,191,522 A | 3/1993 | Bosco et al. | |
| 5,586,252 A | 12/1996 | Barnard et al. | |
| (Continued) | | | |

FOREIGN PATENT DOCUMENTS

| | | |
|---|---|---|
| CN | 102591992 | 7/2012 |
| CN | 102693512 | 9/2012 |
| (Continued) | | |

OTHER PUBLICATIONS

Written Opinion and International Search Report issued in PCT Application No. PCT/SG2020/050074 dated Apr. 2, 2020.
(Continued)

*Primary Examiner* — Ruihua Zhang
(74) *Attorney, Agent, or Firm* — Gardella Grace P.A.

(57) ABSTRACT

In an illustrative embodiment, systems and methods for automatically identifying peer organizations of a subject organization within a transactional platform identify peer organizations of the subject organization by accessing characteristic features and transactional features of the subject organization, providing a portion of the features to similarity analysis models, and obtaining, through executing the models, predicted peer organizations. The predicted peers may be presented to a user arranged in priority order with some peer features of the respective organization and a control for selecting the respective peer. The user may select a subset of the predicted peers for use in comparison metrics.

20 Claims, 10 Drawing Sheets

(56) References Cited

U.S. PATENT DOCUMENTS

| | | |
|---|---|---|
| 6,876,992 B1 | 4/2005 | Sullivan |
| 7,340,426 B1 | 3/2008 | Frutuoso et al. |
| 7,461,044 B2 | 12/2008 | Salahshour et al. |
| 7,698,158 B1 | 4/2010 | Flagg |
| 7,742,966 B2 | 6/2010 | Erlanger |
| 7,813,944 B1 | 10/2010 | Luk et al. |
| 7,962,903 B1 | 6/2011 | Ross |
| 8,335,701 B1 | 12/2012 | Syed et al. |
| 8,666,788 B1 | 3/2014 | Syed |
| 9,317,574 B1 | 4/2016 | Brisebois et al. |
| 9,390,240 B1 | 7/2016 | Brisebois et al. |
| 10,606,853 B2 | 3/2020 | Lyons et al. |
| 10,769,159 B2 | 9/2020 | Lyons et al. |
| 2002/0035488 A1 | 3/2002 | Aquila |
| 2002/0152098 A1 | 10/2002 | Evans et al. |
| 2002/0156657 A1 | 10/2002 | de Grosz et al. |
| 2004/0059589 A1 | 3/2004 | Moore et al. |
| 2005/0033657 A1 | 2/2005 | Herrington et al. |
| 2005/0144046 A1 | 6/2005 | Schloss |
| 2005/0144114 A1 | 6/2005 | Ruggieri et al. |
| 2006/0010217 A1 | 1/2006 | Sood |
| 2006/0136327 A1 | 6/2006 | You |
| 2006/0184485 A1 | 8/2006 | Horvitz |
| 2007/0078849 A1 | 4/2007 | Slothouber |
| 2007/0106753 A1 | 5/2007 | Moore |
| 2007/0156463 A1 | 7/2007 | Burton et al. |
| 2007/0271169 A1 | 11/2007 | Swanson et al. |
| 2008/0103837 A1 | 5/2008 | Flake et al. |
| 2008/0243675 A1 | 10/2008 | Parsons et al. |
| 2009/0204446 A1 | 8/2009 | Simon et al. |
| 2009/0204569 A1 | 8/2009 | Bowden et al. |
| 2010/0010836 A1 | 1/2010 | Rosen et al. |
| 2010/0036684 A1 | 2/2010 | McNamee et al. |
| 2010/0063851 A1 | 3/2010 | Andrist et al. |
| 2010/0114899 A1 | 5/2010 | Guha et al. |
| 2010/0146414 A1 | 6/2010 | Dongole et al. |
| 2011/0161119 A1 | 6/2011 | Collins |
| 2012/0005045 A1 | 1/2012 | Baker |
| 2012/0215578 A1 | 8/2012 | Swierz, III et al. |
| 2012/0239650 A1 | 9/2012 | Kim et al. |
| 2012/0296695 A1 | 11/2012 | McGill et al. |
| 2013/0073346 A1 | 3/2013 | Chun et al. |
| 2013/0110560 A1 | 5/2013 | Syed et al. |
| 2013/0339337 A1 | 12/2013 | Alkhateeb et al. |
| 2014/0067428 A1 | 3/2014 | Snyder et al. |
| 2014/0081903 A1 | 3/2014 | Koosel et al. |
| 2014/0095367 A1 | 4/2014 | Ellis et al. |
| 2014/0129472 A1 | 5/2014 | Stofka |
| 2014/0143831 A1 | 5/2014 | Fieweger |
| 2014/0229205 A1 | 8/2014 | Gibson |
| 2014/0283048 A1 | 9/2014 | Howes et al. |
| 2014/0288979 A1 | 9/2014 | Prinn |
| 2014/0304829 A1 | 10/2014 | Oliver et al. |
| 2016/0132800 A1 | 5/2016 | Davar et al. |
| 2017/0024827 A1 | 1/2017 | McGill et al. |
| 2018/0181625 A1 | 6/2018 | Lyons et al. |
| 2018/0181626 A1 | 6/2018 | Lyons et al. |
| 2018/0181974 A1 | 6/2018 | Lynch et al. |

FOREIGN PATENT DOCUMENTS

| | | |
|---|---|---|
| CN | 103514191 | 1/2014 |
| CN | 105488697 | 4/2016 |
| CN | 106663281 | 5/2017 |
| CN | 110622180 | 12/2019 |
| CN | 110637316 | 12/2019 |
| DE | 202015009327 | 2/2017 |
| EP | 3180761 | 6/2017 |
| EP | 3559871 | 10/2019 |
| EP | 3559888 | 10/2019 |
| JP | 2005004303 | 1/2005 |
| KR | 20130033915 | 4/2013 |
| WO | 2007034179 | 3/2007 |
| WO | 2013067117 | 5/2013 |
| WO | 2013109524 | 7/2013 |
| WO | 2015187558 | 12/2015 |
| WO | 2017027718 | 2/2017 |
| WO | 2018117975 | 6/2018 |
| WO | 2018117976 | 6/2018 |
| WO | 2020167255 | 8/2020 |

OTHER PUBLICATIONS

International Preliminary Report on Patentability issued in PCT Application No. PCT/SG2017/050643 dated Jun. 25, 2019.
International Search Report and Written Opinion issued in PCT Application No. PCT/SG2017/050643 dated Mar. 6, 2019.
International Search Report and Written Opinion issued in PCT Application No. PCT/SG2017/050644 dated Mar. 8, 2018.
International Preliminary Report on Patentability issued in PCT Application No. PCT/SG2017/050644 dated Jun. 25, 2019.
International Search Report and Written Opinion issued in PCT Application No. PCT/US2016/046575 dated Oct. 28, 2016.
International Search Report and Written Opinion issued in PCT Application No. PCT/US2015/033536 dated Aug. 31, 2015.

Peer Benchmark Analysis How does what your client is buying compare to peers? 300

1 Select your client and products to benchmark

| Existing | Prospect 312 | | CLIENT<br>CYBER SECURITY ORG. 302 | US Dollar |
|---|---|---|---|---|

What is this?

○ NETWORK/CYBER/PRIVACY LIABILITY - NETCYBERPRIV ○
Cyber

PRODUCT
Network/Cyber/Privacy Liability - Net... 304

Exposure Type: REVENUES/SALES
Peers: 363

| EXPOSURE TYPE | | YEAR | PREMIUM | EXPOSURE | LIMIT | DEDUCTIBLE | DQ INDICATOR |
|---|---|---|---|---|---|---|---|
| ∨ | Revenues/Sales 306 | 2018 | 770m | 870k | 2.3M | 3.9k | Pass |
| | | 2017 | 750m | 74 | 2.2M | 3.7k | Pass |
| ∧ | Number of Employees 308 | | | | | | |

Select an Exposure and enter any known values

| EXPOSURE TYPE<br>Select Exposure Type | ∨ | PREMIUM<br>0 310 | EXPOSURE<br>0 | LIMIT<br>0 | DEDUCTIBLE<br>0 |
|---|---|---|---|---|---|

| 69 PEERS AVAILABLE | Network/Cyber/Privacy Liability - NetCyberPriv Cyber | | | | | | | | 330 |
|---|---|---|---|---|---|---|---|---|---|

Selected Peers for CYBER SECURITY ORG.
Select between 5 and 10 peers per product to benchmark.

| Client 302 | Country 332a | Year 332b | Industry 332c | SIC Code 332d | Exposure 332e | Premium 332f | Limit 332g | Deductible 332h | DQ Indicator 332i |
|---|---|---|---|---|---|---|---|---|---|
| Cyber Securi... | CAN | 2018 | Technology an... | Computer Prog... | 870k | 770m | 2.3M | 3.9k | Pass |

No peers selected

Not enough peers selected. Please select at least 5 peers to create a benchmark. 338

| Peer 334 | 340a Country 336a Select | 340b Year 336b Select | 340c Industry 336c Select | 340d SIC Code 336d | 340e Exposure 336e Set Range | 340f Premium 336f Set Range | 340g Limit 336g Set Range | 340h Deductible 336h Set Range | 340i DQ Indicator 336i Select |
|---|---|---|---|---|---|---|---|---|---|
| Investments... | CAN | 2018 | Business and P... | Business Asso... | 75M | 52k | 7.7M | 150k | Pass |
| Construction... | CAN | 2018 | Construction | Heavy Constru... | 5.5Bn | 91k | 7.6M | 1.9M | Pass |
| Big Co Cor... | CAN | 2018 | Construction | Single-Family H... | 2.6Bn | 46k | 3.9M | 78k | Pass |
| Utilities... | CAN | 2018 | Power | Electric And Ot... | 290M | 51k | 4.0M | 80k | Pass |
| Our College... | CAN | 2018 | Public Sector | Junior Colleges... | 330M | 62k | 7.6M | 95k | Pass |
| Motor Corp... | CAN | 2018 | Public Sector | Membership Or... | 360M | 43k | 3.9M | 39k | Pass |

FIG. 3B

SYSTEM AND METHODS FOR IDENTIFICATION OF PEER ENTITIES

RELATED APPLICATIONS

This application claims priority to U.S. Provisional Patent Application Ser. No. 62/805,594, entitled "System and Methods for Identification of Peer Entities," filed Feb. 14, 2019. This application is related to the following prior patent applications directed to identifying related entities for benchmarking purposes: U.S. patent application Ser. No. 15/850,047, entitled "Systems and Methods for Intelligent Prospect Identification Using Online Resources and Neural Network Processing to Classify Organizations Based on Published Materials," filed Dec. 21, 2017 (now published as US2018/0181625), and U.S. patent application Ser. No. 15/286,405, entitled "Dashboard Interface, Platform, and Environment for Supporting Complex Transactions and Deriving Insights Therefrom," filed Oct. 5, 2016 (now published as US2017/0024827). All above identified applications are hereby incorporated by reference in their entireties.

BACKGROUND

Peer benchmarking in transactional environments relies upon identification of similar entities to the subject organization. Historically, peer organizations have been identified using a variety of techniques. In a first example, peer metrics may correspond to a selection of top performers within the system or platform. Performance may be determined based upon, in some examples, premium share, market share, or performance specific to a metric identified by or accessed by a user. However, this method may result in an apples to oranges comparison of large, well-positioned entities to a smaller, newer, and/or geographically distinct entity. In another example, organizations may be classified by a number of factors (e.g., industry, region, size, etc.) and peers may be selected based upon factor similarities. However, oftentimes organizations may be classified within a number of industries, a number of regions, or otherwise fail to submit to binary classification in light of one or more factors. Further, in some systems there may be errors in classification leading to missed correlations between an entity and its true peer(s). In a further example, a user may supply a number of competitors, by name, for use in presenting peer comparison data. The user may need to supply a threshold number, further to the example, to avoid the ability of the subscriber to identify competitor metrics as belonging to a particular competitor. The user, in this circumstance, may arbitrarily select recognized names as opposed to entities truly similar to the requesting organization, for example, based upon a limited recognition of the organization's peers in the marketplace.

In each of the above examples, as explained, the most relevant peers to the organization may be overlooked. Thus, the inventors identified a need for an improved method and system for discovering and applying the most relevant peer organizations to a requesting entity based upon analysis of commonalities between organizations across a broad number of factors.

SUMMARY OF ILLUSTRATIVE EMBODIMENTS

In one aspect, an automated method and system for discovering and applying the most relevant peer organizations to a requesting entity includes accessing data identifying and describing member organizations of the platform, characterizing the requesting entity using a number of features relevant to the data, and applying one or more models to the data to identify peer organizations to the requesting entity. The features, in some examples, can include industry, region, and/or product classification(s). Additionally, in reference to the insurance industry, the features can include exposure and program structure. The models use similarity modeling to find the nearest neighbor or closest peer. Machine learning driven feedback modeling may be used to create feature vectors for each member organization of the platform and each potential peer organization.

In some implementations, the improved method and system benefits the requesting entity through diversification of peer candidates by breaking down peer similarities into a number of discrete models. The models, in some examples, can include a product similarity model, an organization structure similarity model, a performance similarity model, and/or an industry similarity model. The results of the method and system may include a number of candidate peers selected from each model.

In some implementations, the requester can express a preference for one or more models. For example, the user may identify or rank in importance particular features such as product or program structure. In one example, a portion of peers recommended through each model may be weighted based upon the user's identification of important features. In another example, peers recommended through a model aligned with the user's prioritized features may be promoted within a list of results. In a particular example, if the user is interested in identifying peers with layered polices, then peers identified through a program structure similarity model may be prioritized within the results.

The forgoing general description of the illustrative implementations and the following detailed description thereof are merely exemplary aspects of the teachings of this disclosure and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings:

FIG. 3A is a screen shot of an example user interface for requesting identification of peers for use in comparison metrics;

FIG. 3B is a screen shot of an example user interface for interacting with a set of peers identified through applying one or more peer discovery algorithms to system data records;

DETAILED DESCRIPTION OF ILLUSTRATIVE EMBODIMENTS

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

Figure 1A:
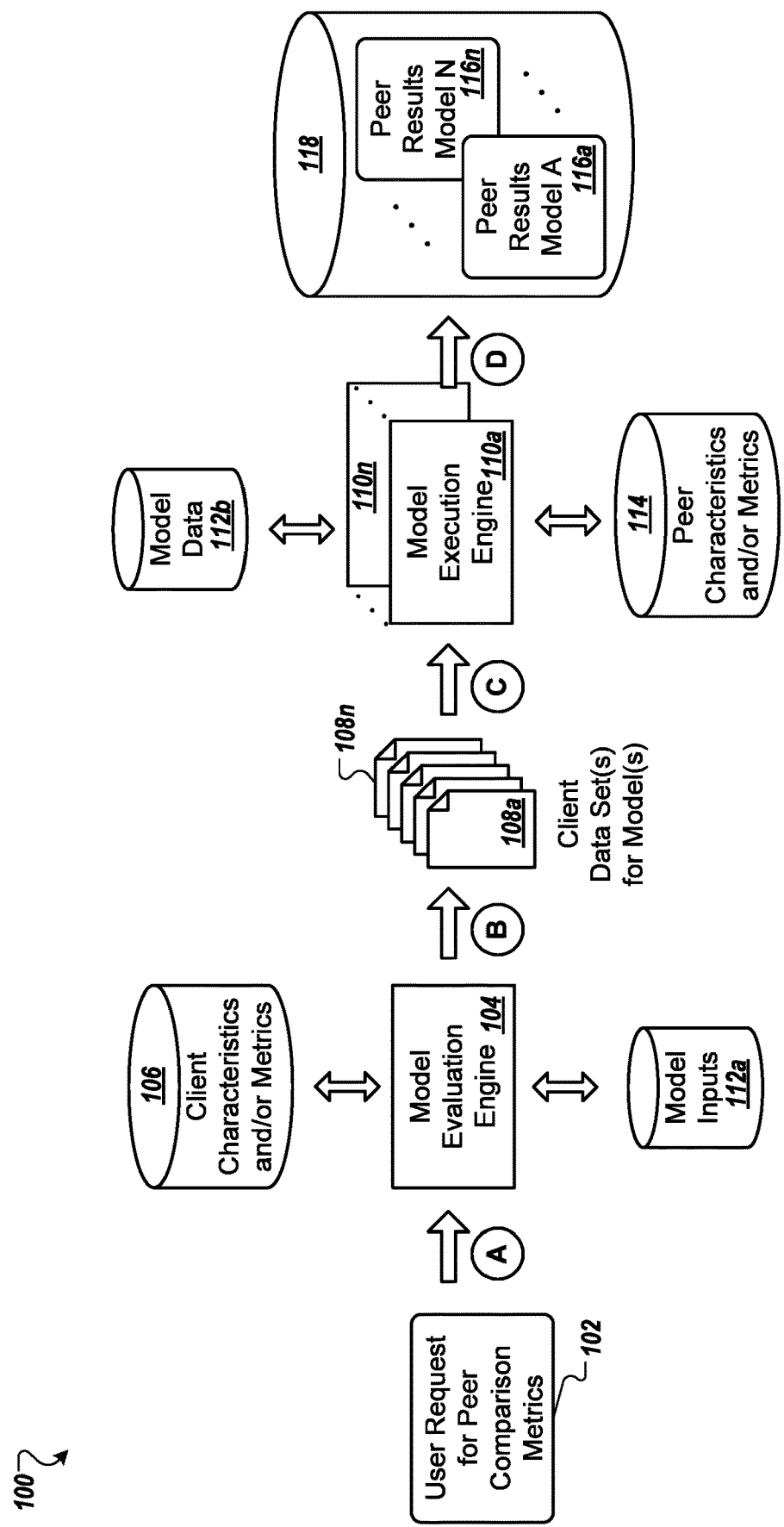
FIG. 1A and FIG. 1B are system flow diagrams of an example system for peer discovery using data correlations and learning algorithms.
Figure 1B:
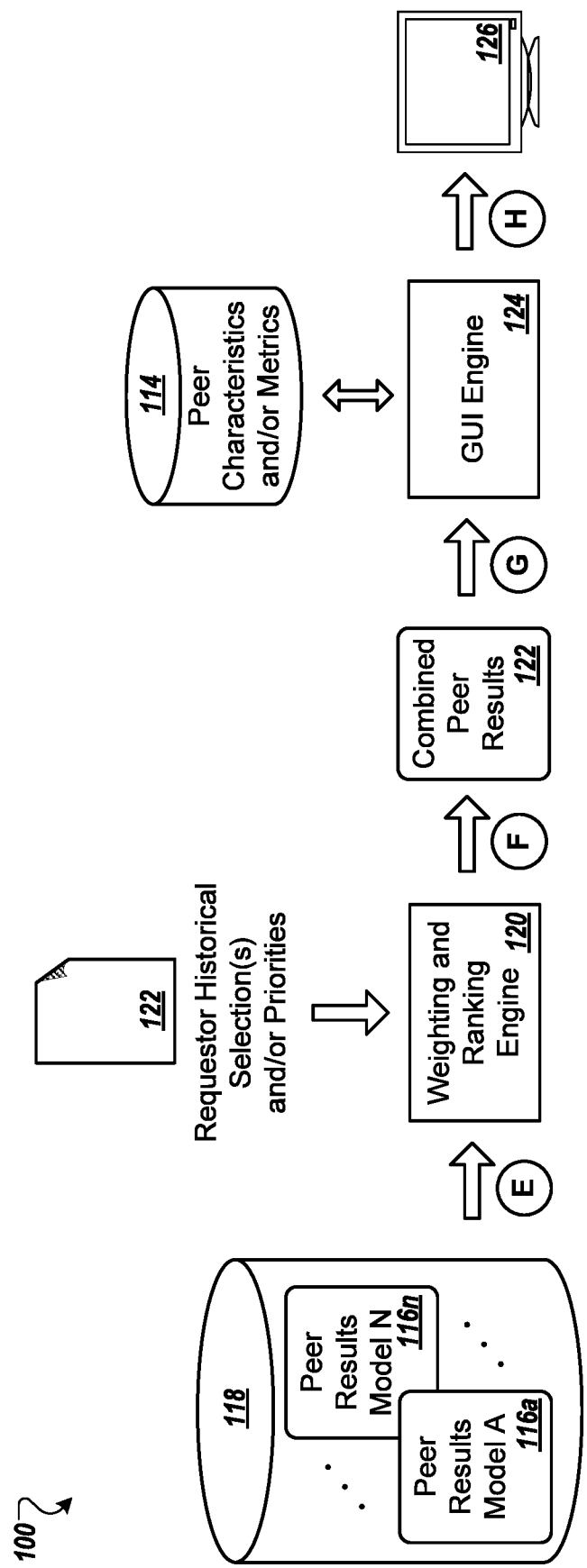

FIGS. 1A and 1B are system flow diagrams of an example system flow 100 for peer discovery in a transactional platform using data correlations and learning algorithms. A requestor using the system 100 may wish to conduct a comparison of performance metrics with the metrics of additional peer organizations. While a requestor may recognize certain entities as competitors, oftentimes an organization has an incomplete understanding of similar organizations appropriate for performance comparisons. This may be especially true when an organization has just begun working in a new line of business, expanding to a new geographic region, and/or offering a new product type. Further, while an organization may focus upon a small handful of key competitors, for privacy reasons, a larger number of peers may need to be combined to generate metrics which cannot be reverse-engineered to obtain details regarding a particular organization. Thus, the system flow 100 enables peer discovery using a number of models or classification algorithms designed to match characteristics and/or metrics 106 of the requestor (or requestor's client) with other organizations within the transactional platform. Further, the system flow 100 automates the identification and presentation of peer organizations on a scale that is not capable of being achieved by manual methods.

In some implementations, the system flow 100 begins with receiving a user request 102 for peer comparison metrics. The request, in an illustrative example, may be received by an insurance broker for use in preparing a comparison of product coverage of various peers of a target client. The request, in simplest form, identifies a client organization. The organization may be a member of the transactional platform. In this circumstance, the system flow 100 may obtain the client characteristics and/or metrics 106 for use in identifying peer organizations from internal records. If, instead, the client is not a member of the transactional platform (e.g., a prospective client), the user may be prompted to enter information regarding the client organization. The client characteristics and/or metrics 106, in some examples, include business-related information (e.g., industry, size, region, etc.) and/or transaction-related information (e.g., performance within the platform, product, exposure values, etc.). In some examples, the client characteristics and/or metrics 106 may include a client name, geographic location(s), product identifier(s), revenue data, size data (e.g., number of employees), and/or industry(s) to populate the client characteristics and/or metrics 106. In some embodiments, a portion of the client characteristics and/or metrics 106 may be automatically obtained through external data sources such as, in some examples, Bloomberg, D&B Hoovers, S&P Global, or NASDAQ. The user, in some implementations, may be requested to confirm the client characteristics and/or metrics 106.

In some embodiments, the requester is presented with the opportunity to identify relative importance of at least a portion of the client characteristics and/or metrics 106. For example, the requester may be presented with user interface controls to graphically identify relative weights to apply to a business-related model versus a transaction-related model. In some examples, if the requester does not indicate relative weights for the client characteristics and/or metrics 106, the system may apply a set of default weights based on historical information indicating weights previously applied by the client and/or average weights from organizations sharing one or more characteristics with the requester. In other examples, the default weights may be equal to one another.

In some implementations, the client characteristics and/or metrics 106 are provided to a model evaluation engine 104 to identify applicable models and to supply data sets 108 appropriate for the execution of those models. The model evaluation engine 104 may access model inputs 112a stored in a data repository to determine characteristics and/or metrics appropriate to each model. In some examples, the model evaluation engine 104 determines whether the identified characteristics and/or metrics have been provided in the client characteristics and/or metrics 106. In one example, the model evaluation engine 104 may identify a subset of models appropriate to the request submitted by the user. Further to the example, not all models may be appropriate depending upon the particular geographic region, product, or industry identified within the user request. In another example, the model evaluation engine 104 may identify a subset of models appropriate to the available client characteristics and/or metrics 106 (e.g., models having adequate characteristics and/or metrics inputs provided in the client characteristics and/or metrics 106 to appropriately match the client to peer organizations).

Further, in some embodiments, the model evaluation engine 104 validates the submitted characteristics and/or metrics for completeness and/or consistency prior to making it available for execution by a model. For example, some data may be absent or missing, or the values supplied may be outside specified boundaries for the type of data. For example, for a new member of the platform, some transaction-related data may be missing or insufficient for deriving some of the transaction-related metrics.

The requester, in some embodiments, is asked by the model evaluation engine 104 to supply information regarding one or more of the missing or otherwise invalid client characteristics and/or metrics. In another example, if the client submitted by the requestor represents a variety of industries and business lines, the requestor may be prompted to narrow the request for peers, if desired, to a certain subset of the requester's overall business. In other embodiments, models are automatically filtered out based upon lack of trustworthy and/or sufficient data.

For each of the models selected by the model evaluation engine 104, in some implementations, a separate set of client data 108 is provided to a model execution engine 110 for executing that model. In some implementations the sets of client data 108 may be grouped according to the type of data used by a respective model. For example, the model evaluation engine 104 may provide a first client data set 108a containing transactional-based metrics for execution by a first model execution engine 110a executing a transactional model, and a second client data set 108b containing business-related characteristics for execution by a second model execution engine 110b executing a business similarities model.

In some embodiments, the model execution engine(s) 110 execute models using model data 112b and peer characteristics and/or metrics 114. A first model executed by a first model execution engine 110a, in some implementations, is based upon k-nearest neighbors (KNN) clustering. For the KNN model, a training set of data 112b is used to produce results based upon information the model knows (e.g., known peer characteristics and/or metrics 114 related to peer organizations within the transactional platform). In some implementations, a second model executed by a second model execution engine 110b is a Business Lines Similarity (BLS) model designed to identify peers sharing similar product(s) in one or more similar industries (e.g., based upon peer characteristics and/or metrics 114 representing business line data). Characteristics and/or metrics 114 contributing to the BLS model, in some examples, can include global industry, global product, exposure variable and value. In some implementations, a third model execution engine 110c executes a Program Structure Similarity (PSS) model. Characteristics and/or metrics 114 contributing to the PSS model, in some examples, include one or more trade types, such as basic co-insured programs or layered programs.

The model execution engine(s) 110, in some implementations, supply a separate set of peer results 116 for each model executed. The peer results 116 of the multiple models may have little to no overlap in identified peers. For example, unlike the BLS model, the PSS model may present peers in industries unrelated to the client industry. Further, the program structure may be indicative of relative size of the organizations, such that the PSS model is more likely to identify similarly sized peers to the client. Thus, application of multiple models may provide greater diversity in peer candidates to the requester. The strategic identification, by the system, of specific models for peer identification that may not be intuitive to a human evaluator further improves system processing efficiency by applying such models where the peer characteristics and/or metrics 114 for the respective model align with the client characteristics and/or metrics 106 of the requester.

Each set of peer results 116, in some implementations, includes a listing of peers and a confidence rating for each identified peer. The confidence rating, for example, may provide a relative strength of match between the client and the identified peer. The listing of peers, in some embodiments, includes a key for identifying each peer organization within the transactional platform such that metrics related to the peer may be accessed at a later point. In other implementations, the peer results 116 include characteristics and/or metrics 114 for use in peer benchmarking. The peer results 116, in some implementations, are stored in a temporary storage region 118 for later application.

Turning to FIG. 1B, in some implementations, the peer results 116 are accessed by a weighting and ranking engine 120 for combining into a single set of results for presentation to the user. The weighting and ranking engine 120, for example, may select the top X references from each of the sets of peer results 116 according to the confidence ratings. In one example, the weighting and ranking engine 120 may select 50 total peers from the results of two models (e.g., peer results set 116a and peer results set 116b).

If the requestor submitted a prioritization, in some implementations, the weighting and ranking engine 120 accesses priorities 122 in weighting the results of each model 116. As discussed above, for example, the requester may have graphically identified relative weights to apply to a business-related model versus a transaction-related model. At this point, a larger number of results may be selected by the weighting and ranking engine 120 from the preferred model in comparison to the less important model to the requestor. For example, if the business-related model was deemed twice as important as the transactional model, two thirds of the total results may be derived from a business-related model result set 116a, and one third of the total results may be derived from a transactional-related model result set 116b.

In some implementations, the weighting and ranking engine 120 takes into consideration historical selections 122 made by the requestor. In the event that the client is a historic member of the transactional platform, for example, the weighting and ranking engine 120 may promote organizations within the peer results sets 116 previously identified by the requestor as being a peer of the client. Conversely, the weighting and ranking engine 120 may promote organizations within the peer results sets 116 where the requestor (or another user) previously identified the client as a peer of those organizations. The historical pairings of peers, for example, may be maintained by the transactional platform to aid in the requestor's future identification of peers.

In some implementations, after selecting the subset of results of each of the peer result sets 116, the weighting and ranking engine 120 ranks the results. For example, the confidence ratings may be used to rank peers within the combined peer results. Further, in the event that an overlap of a same peer occurred within two or more of the results sets 116, the multiply-identified peer may be promoted as a strong candidate for matching the client. The weighting and ranking engine 120 may produce a combined list of peer results 122.

In some implementations, a graphical user interface (GUI) engine 124 accesses the combined peer results 122 for display to the requestor at a remote requester display device 126. The GUI engine 124, for example, may access peer characteristics and/or metrics 114, to the extent they were not included in the combined peer results 122, for presentation to the requestor. The GUI Engine 124 may generate a user-interactive display of peer results for selection of a final set of peers by the requestor. In an illustrative example, the combined peer results 122 may include between 30 and 100 potential peers, and the requestor may narrow the peer results through selection of at least five of the combined peer results 122. The GUI display created by the GUI engine 124, for example, may require that the requestor select a minimum number of peers to obtain de-identified metrics for presentation at the remote device 126.

In other implementations, rather than obtaining final peer selections by the requestor through the GUI engine 124, the weighting and ranking engine 120 may select the set of combined peer results 122 for automatic generation of peer comparison metrics by the GUI engine 124. For example, the GUI engine 124 may produce, based upon metrics identified within the initial request 102, a graphical user interface comparing transactional metrics of the client to peer transactional metrics.

Figure 2A:
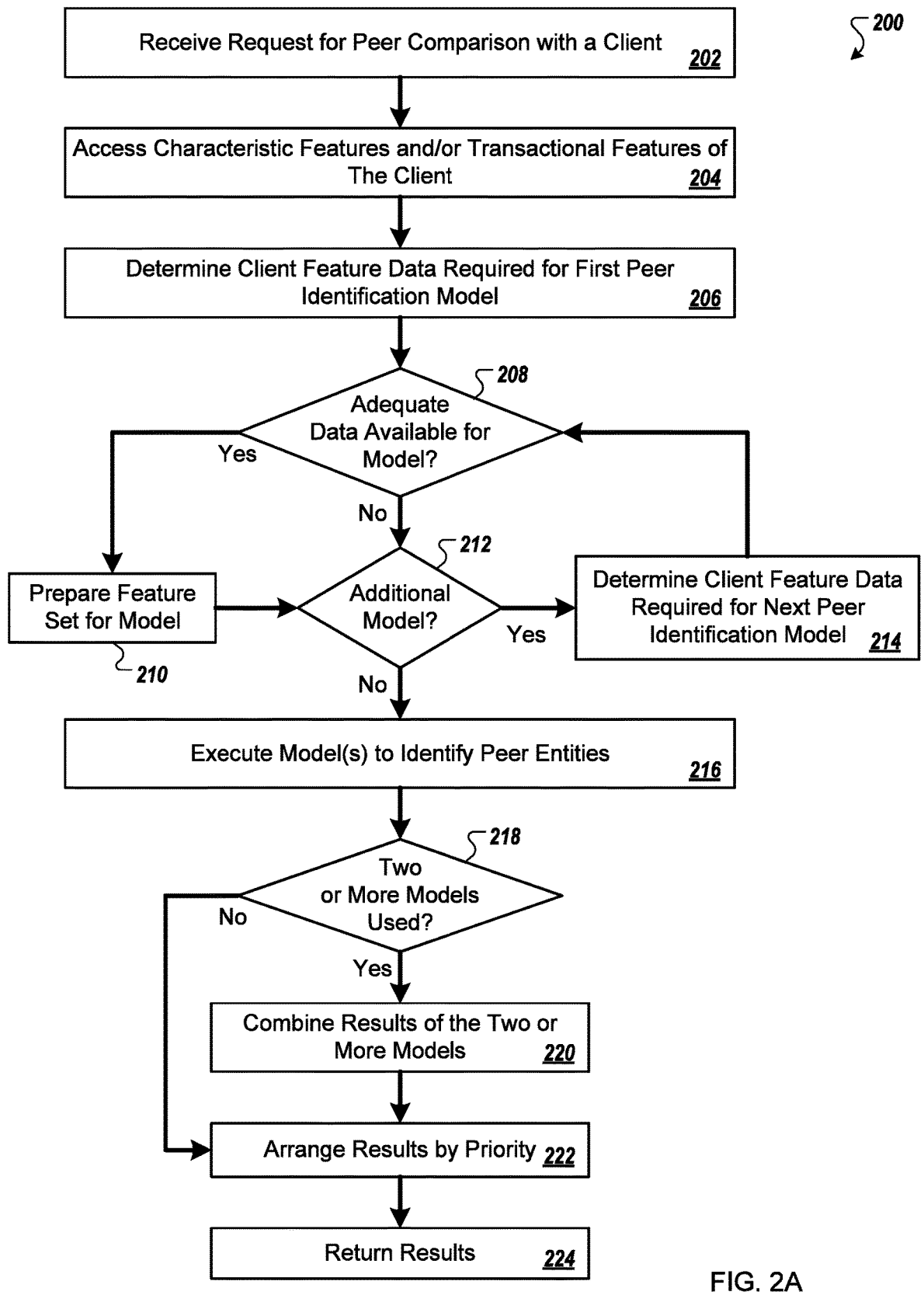
FIG. 2A is a flow chart of an example method for identifying and providing a set of peers for use in peer comparison metrics.

FIG. 2A is a flow chart of an example method 200 for identifying and providing a set of peers for use in peer comparison metrics. The method 200, for example, may be executed by elements of the system flow 100 of FIGS. 1A and 1B.

In some implementations, the method 200 begins with receiving a request for peer comparison with a client organization (202). The request, for example, may be submitted by a remote computing device in communication with a transactional platform. The user request, for example, may be the user request 102 of FIG. 1A.

In some embodiments, the user request is submitted through a peer benchmark analysis graphical user interface, such as a peer benchmark analysis screen shot 300 of FIG. 3A. Turning to FIG. 3A, a requestor has entered client "CYBER SECURITY ORG." 302. Additionally, the requestor has selected product network/cyber/privacy liability 304.

Returning to FIG. 2A, in some implementations, characteristic features and/or transactional features of the client identified in the request are accessed (204). The features, for example, may be derived from member identification records and/or transactional records of transactions performed by the member (e.g., metrics representing transactions submitted over time by the client, representative transactional data of the client's activities within the transactional platform, etc.). The features, in one example, may include the client characteristics and/or metrics 106 of FIG. 1A. Turning to FIG. 3A, the features and metrics may include revenues and sales data 306, number of employees 308, and/or exposure type 310.

Returning to FIG. 2A, in some implementations, client feature data required for a first peer identification model is determined (206). Each peer identification model, such as the models discussed in relation to the model inputs 112a and model data 112b of FIG. 1A, may require a particular set of input data for use in identifying peer organizations to the client organization. Some models may be more business-related in nature, while other models are more transactional-related in nature. The model evaluation engine 104 of FIG. 1A, for example, may determine client feature data required for the model. The client feature data may include business characteristics of the client organization as well as transactional metrics collected by the transactional platform. If the client is a prospective client, the user may be queried to enter business characteristics and transactional information for use in identifying appropriate peers. For example, turning to FIG. 3A, a prospect control 312, when selected, may provide the requestor with the opportunity to provide characteristics and metrics regarding a prospective client.

Returning to FIG. 2A, in some implementations, if adequate information is available (208), a feature set for the model is prepared (210). For example, inputs required for the model may be collected and formatted as one of the data sets 108 for providing to one of the model execution engines 110, as illustrated in FIG. 1A. The feature set may be collected from multiple data bases, such as a user information data base and a transactional data base.

In some implementations, if the information available is inadequate to supply inputs to the model (208), or after the feature set for the model is prepared (210), it is determined whether there are additional models (212). As discussed in relation to FIG. 1A, multiple models may be analyzed to produce potential peers of the client identified by the requestor. For each of these additional models, it may be determined what client feature data elements are required for the particular peer identification model (214) and, if such data is available (208), an additional feature set may be prepared for such model (210).

In some implementations, once all of the models have been considered and each feature set prepared (212), the models for which feature sets have been prepared are executed to identify peer entities (216). The model execution engine(s) 110 of FIG. 1A, for example, may be used to execute the models using the client data set(s) 108 and, if applicable, other model data 112b. As described in relation to FIG. 1A, the models may include a BLS model and a PSS model. The results of the execution of the model(s) may be stored in a temporary storage region, such as the storage region 118 of FIG. 1A.

In some embodiments, execution of one or more of the models involves a k-nearest neighbor (KNN) clustering algorithm using the features input for the model. When using a KNN clustering algorithm, the requestor describes the client using a handful of features, and these features are arranged as a vector of its features. Each potential peer client, similarly, can be described as a vector using values of the same features. Next, the peer organizations are selected based on similarity between the requestor client vector and each potential peer client vector. In determining the distance, the KNN algorithm may use different distance metrics and/or magnitude metrics. In a particular example, a cosine distance metric may be used to identify angular distance between the Business Line similarity features of the requestor's client and the peer clients, thus finding peers demonstrating similarity in behavior in relation to the Business Line feature. In another example, policy data features of the requestor's client and the peer clients may be compared using a magnitude of variance metric to identify closely related policy data between the requestor's client and one or more peers. In some embodiments, the potential peer vectors are pre-calculated (e.g., on a periodic basis or as new data is added to the transactional platform relevant to the features used in the vector). Data validity and consistency may be assured and maintained, for example, through collecting the information in advance and from sources of qualified data records. Additionally, calculating the vector information in advance may speed processing when calculating results. In other embodiments, the potential peer vectors are calculated in real time responsive to the request for peer organizations. Real time calculation, for example, may provide the most accurate matches based upon up-to-date transactional information while saving on storage space for storing the vectors. Therefore, these feature vectors that uniquely characterize clients and their peers allow the system to function more efficiently and provide improved accuracy in insights provided to clients that manual human methods are unable to achieve.

In some embodiments, execution of a peer identification model involves deriving a characterization of the client organization submitted by the requestor from publicly available information from external data sources to identify peer entities. Overlapping board members between corporate entities, for example, may be discovered through information published by Bloomberg, D&B Hoovers, S&P Global, or NASDAQ. In another example, the model may deploy web crawling bots to identify news articles naming the requestor submitted client and identify organizations named within the same publication.

In some embodiments, the results obtained through each model are filtered to identify the best results. In one example, each model is programmed to return a particular number of results, such as, in some examples, twenty, thirty, fifty, seventy-five, or one hundred records. In another example, each model is programmed to return all results having a confidence level above a certain threshold such as, in some examples, sixty, seventy, seventy-five, eighty, or over ninety percent confidence level. The confidence threshold level may vary based upon the closeness approximation desired. For example, sixty percent may equate to somewhat similar (e.g., gathering a large number of potential peers including edge cases), eighty percent may equate to generally similar (e.g., useful in most circumstances), while ninety percent may equate to very similar (e.g., supplying a stronger exactness in peer match but reducing the candidate pool accordingly). In a particular example, a given model may be programmed to return at least a minimum threshold of results and up to a maximum threshold of results of a confidence level of X % or above.

In some implementations, if two or more models were executed (218), the results of the models are combined to obtain combined search results (220). For example, as discussed in relation to FIG. 1B, the sets of results 116 may be accessed from the storage region 118 and combined by the weighting and ranking engine 120. In one example, the combined results may be filtered to identify any duplicate results. Any duplicate results may be prioritized or given greater weight, for example, for having been identified multiple times.

If the requestor submitted prioritization information regarding the results, such as relative weights to apply between business characteristic based models versus transactional metric based models, in some embodiments, the results are combined to use the top X results of one set of results and the top Y results of the other set of results according to the ranking, as described in greater detail in relation to FIG. 1B.

In some embodiments, historical selections by the requestor are considered in creating the final result set. For example, if the requestor (or, alternatively, a different requestor) previously requested a peer comparison on behalf of the requested client, the selections made during the previous peer comparison(s) may be added to and/or promoted within the peer results list (e.g., the confidence rating of any such peer organization may be increased).

In some implementations, the combined results are arranged by priority (222). For example, the weighting and ranking engine 120 of FIG. 1B may arrange the combined results according to the confidence levels associated with each potential peer. Where two or more peer results share a same confidence level, in some embodiments, the results are arranged in alphabetical order. In other embodiments, peer results sharing a same confidence level may be prioritized by other indicia such as, in some examples, whether each result was obtain through the preferred model type (e.g., business model versus metrics model), whether any of the results were identified by multiple models, and/or whether any of the results share a key characteristic with the requestor-identified client (e.g., industry, geographic region, line of business, etc.) By dynamically adjusting the weights and/or applied to the peer results from different peer identification in real-time based on unique aspects of each client, the system is able to identify highly tailored subsets of peers in real-time that humans would be unable to identify manually due to human bias and lack of intuition into the methods employed by the models to identify peers.

In some implementations, the results are returned to the requestor (224). For example, the results may be made available to a graphical user interface engine, such as the GUI engine 124 of FIG. 1B, for presentation to the requestor. As shown in FIG. 3B, for example, a screen shot 330 presents characteristics and features 332 of the client 302. Characteristics of the client 302 include a region (country) 332a, an industry 332c, and a Standard Industrial Classification (SIC) code 332d. Features of the client's transactional history with the platform include a year 332b the client's insurance policy became effective, an exposure value 332e, a premium value 332f, a limit value 332g, and a deductible value 332h. Further, client features may include a data quality (DQ) indicator 332i representing the completeness and/or estimated accuracy of information supplied regarding the client 302. These same characteristics and features are mirrored in peer characteristics and features 336a through 336i for each peer 334 returned to the requestor for review.

As illustrated in FIG. 3B, in some implementations, the requestor is instructed to select a minimum number 338 of peers 334 (e.g., five), for preparation of benchmark metrics. In conducting the review and selection, the requestor may sort the peers 334 according to any of the characteristics and features 336. By default, the peers 334 may be arranged in order of confidence of match with the client 302.

Although illustrated as a particular series of steps, in other embodiments, more or fewer steps may be included in the method 200. For example, prior to determining the client feature data required, the method 200 may identify one or more types of models preferred by the requestor. For example, the requestor, in some implementations, may be provided the ability to submit preferences toward transactional models versus business information models. In another example, upon determining the data is inadequate (e.g., data for one or more features is absent or missing), the data may be approximated or corrected in some manner to provide ample information for identifying peer organizations. In particular, in the circumstance of layered or tower pricing structures, competitors may have similar but mismatched structures (e.g., some layers may be missing, other layers may not quite match up). Methods and systems for addressing mismatching layer or tower pricing structures are described in U.S. Ser. No. 15/852,260 entitled "Methods and Systems for Performing Pricing Comparisons of Complex Layered or Tower Pricing Structures with Varying Pricing Components" filed Dec. 22, 2017 and incorporated herein by reference in its entirety. In another example, in some implementations, rather than verifying availability of adequate data, one or more models are programmed to automatically gather client feature data (e.g., access one or more data bases to obtain data records based upon the identified client). In this circumstance, the output of the model, including the confidence in the accuracy of the matching of each peer organization, may be indicative of poor-quality data obtained by the model.

Additionally, in some embodiments, some of the steps of the method 200 may be performed in a different order or in parallel. For example, the models may begin execution (216) while additional models are being evaluated for available client feature data (214) to allow for parallel processing of a portion of the method 200. In another example, the results of the models may be combined prior to filtering to the top results. Other modifications may be made to the method 200 while remaining in the spirit and scope of its functionality.

Figure 2B:
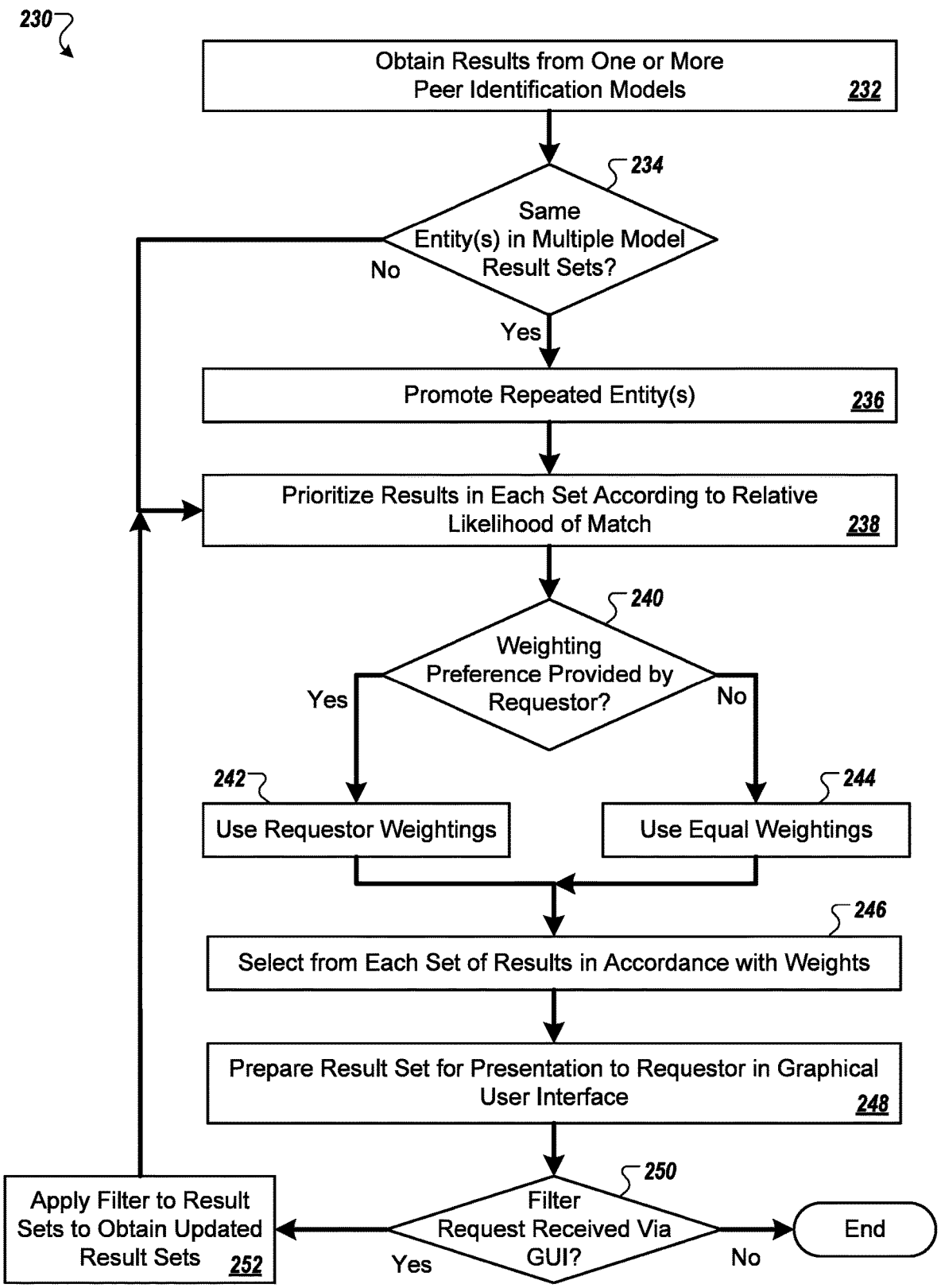
FIG. 2B is a flow chart of an example method for selecting the most relevant peers obtained through applying multiple peer discovery algorithms to platform data records of a transactional platform.

FIG. 2B is a flow chart of an example method 230 for selecting the most relevant peers obtained through applying multiple peer discovery algorithms to platform data records of a transactional platform. The method 230, for example, may be performed at least in part by the weighting and ranking engine 120 of FIG. 1B. The method 230, in some embodiments, describes certain details of the steps of combining results of two or more models (220) and arranging the results by priority (222) of the method 200 of FIG. 2A.

In some implementations, the method 230 begins with obtaining results from one or more peer identification models (232). For example, the results may be obtained by the model execution engine(s) 110 of FIG. 1A. Obtaining the results, for example, may be performed as described in relation to step 216 of FIG. 2A.

In some implementations, if the same entity is identified as a peer in multiple result sets generated by two or more models (234), the repeated entities are promoted as peer matches (236). The promotion, in some examples, can include adding the repeated entity(s) to the top of the list as the most likely candidate(s), increasing the confidence value of the repeated entity(s) by a threshold percentage (e.g., 10%, 20%, 50%, etc.), or increasing the confidence value of the repeated entity(s) by a threshold value (e.g., 10 points, 20 points, 50 points, etc.). In determining repeated entity(s), in some embodiments, the system analyzes identified peers for matches based upon entity relationships. For example, a same entity may include a number of subsidiaries, such that two identified peers function under the same corporate structure. For example, U.S. Patent Pub. No. 2018/0181625 entitled "Systems and Methods for Intelligent Prospect Identification Using Online Resources and Neural Network Processing to Classify Organizations based on Published Materials" describes systems and methods for resolving entity relationships through name variants and corporate hierarchies, the entire contents of which is incorporated herein by reference.

In some implementations, the results in each set are prioritized according to a likelihood of match (238). Using confidence values associated with each of the entities, for example, the peers in each list of results may be organized according to likelihood of match. The weighting and ranking engine 120 of FIG. 1B may perform the prioritization. The peer results, for example, may be arranged as described in relation step 222 of FIG. 2A.

In some implementations, if a weighting preference was provided by the requestor (240), requestor weightings are identified for application to the result sets (242). As discussed in relation to FIG. 1B, for example, the requestor may have graphically identified relative weights to apply to a business-related model versus a transaction-related model. For example, if the business-related model was deemed twice as important as the transactional model, two thirds of the total results may be derived from a business-related model result set, and one third of the total results may be derived from a transactional-related model result set. In another example, if the requestor or another user previously identified one or more of the potential peers as being a peer of the client, those entities may be promoted within the peer results.

If, instead, no weighting preference was provided (240), in some implementations, equal weightings are used (244).

In some implementations, peers are selected from each set of results in accordance with the weighting and the likelihood of match (246). Unless requestor weightings were identified (242), an equal number of results are selected from each of the result sets of each model executed.

In some implementations, the result set is prepared for presentation to the requestor in a graphical user interface (248). For example, the GUI engine 124 may prepare the results for presentation at the user interface 126, as described in relation to FIG. 1B. The graphical user interface, for example, may be similar to the screen shot 330 of FIG. 3B.

In some implementations, a filter control is selected by the requestor via the user interface (250). Turning to FIG. 3B, in some embodiments, the requestor may filter the peers 334 by one or more of the characteristics and features 336. For example, each of the region 336a, the year 336b, the industry 336c, the exposure value 336e, the premium value 336f, the limit value 336g, the deductible value 336h, and the DQ indicator 336i is associated with a corresponding filter control 340 to either specify a value range (e.g., 340d, 340e, 340f, and 340g) or to select specific characteristic and/or property information (e.g., 340a, 340b, 340c, 340h). In a particular example, the industry 336c may be limited to particular industries such as industry 332c (technology . . . ), while the premium value 336 may be increased to a value closer to the premium 332f of 770 million, such as "at least 500 million."

If the filter control was selected, in some implementations, a filter is applied to the result sets to obtain updated result sets (252). For example, upon filtering, in some implementations, the method 230 returns to the results of the execution of the model(s) 238 to re-evaluate the results in light of the filtered characteristics and/or features supplied by the requestor. Further, the results may be recombined (246) prior to returning updated results to the requestor (248). In some examples, because of the use of the customized data structures used in execution of the model(s) (e.g., client feature vectors, peer feature vectors), the method 230 can provide real-time adjustments to the results in light of the provided filter inputs.

Although illustrated as a particular series of steps, in other embodiments, more or fewer steps may be included in the method 230. For example, in other embodiments, filtering may involve filtering the originally supplied results (246) rather than returning to the original complete set(s) of results (238).

Additionally, in some embodiments, some of the steps of the method 230 may be performed in a different order or in parallel. For example, in other embodiments, the results may be prioritized after selecting from each result set (e.g., during combining step 246). Other modifications may be made to the method 200 while remaining in the spirit and scope of its functionality.

Figure 4:
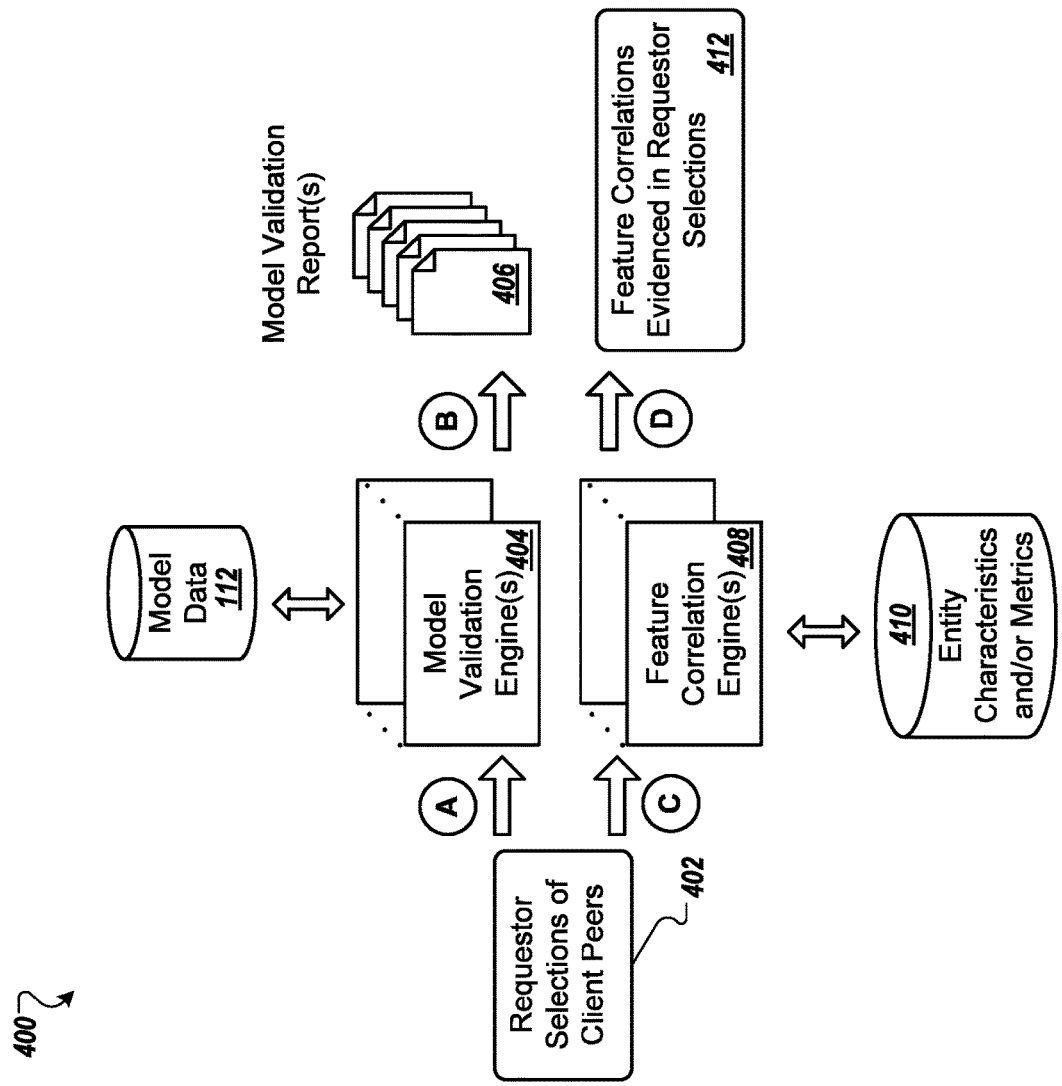
FIG. 4 is a system flow diagram of an example system for developing and refining peer discovery algorithms for identifying peers within a transactional platform using platform data records.

FIG. 4 is a system flow diagram of an example process flow 400 for developing and refining peer discovery algorithms for identifying peers within a transactional platform using platform data records. The process flow 400 may aid in model validation of the models executed by the model execution engine(s) 110 of FIG. 1A. Further, the process flow 400 may aid in identifying features and/or characteristics most relevant to determining peers (e.g., features and/or characteristics which may be included into a new peer identification model).

In some implementations, the process flow 400 begins with receiving a requestor's selections of peers of an identified client (402). The selections, for example, may be obtained through the graphical user interface screen shot 330 of FIG. 3B. For example, the selections may be obtained through the GUI engine 124 of FIG. 1B. The selections may identify a peer entity as well as, in some embodiments, identification of a model through which the peer entity was identified. Further, the selections may each identify a confidence value attributed to the particular peer entity. In some embodiments, the selections may additionally include interactions of the user with the graphical user interface, such as selected filters and/or particular ranges or categories applied to the initial results through interactions with the filters.

In some implementations, the selected peers are supplied to one or more model validation engines 404 for validating the confidence ratings applied by each model. The model validation engine(s) 404, for example, may compare the model's top prioritized peer suggestions to the requestor's peer selections. The model validation engine(s) 404, in some embodiments, feed the requestor selections to model data 112 for learning purposes, thereby improving the algorithm for future use. The selections, in some embodiments, are each correlated with at least one peer identification model. In this manner, the model validation engine 404 associated with a particular model may apply those peers identified through that model as learning data for refining that model.

The model validation engine(s) 404, in some implementation, create one or more model validation reports 406. The model validation reports may provide metrics regarding the overlap of highest confidence peers with the requestor's selected peers. Further, if the requestor submitted additional peers not identified by the model(s), the model validation reports 406 may supply metrics or other information regarding the propensity for requestors to identify peers outside the suggested peers. Additionally, the model validation reports may include information regarding common filters applied to results by the users prior to and/or during the process of selecting peers.

To further refine the functionality of the peer identification models, in some implementations, one or more feature correlation engines 408 may correlate the features and characteristics of the requestor selections with features and characteristics of the client to identify patterns or trends of similarities between the client and the selected peers. To the extent these features and characteristics are not provided with the selections 402, in some embodiments, the feature correlation engine(s) 408 may access entity characteristics and/or metrics of both the client and the selected peers to cross-reference similarities in characteristics and features. A first feature correlation engine 408 may identify direct correlations, such as industry and region, while a second correlation engine 408 may identify indirect correlations, such as metrics within a certain range. The range, in one example, may be selected by the requestor through the filters, as described in relation to FIGS. 2B and 3B. Information regarding feature correlations evidenced in the requestor selections 412 may be provided by the feature correlation engine(s) 408 for use in building additional model(s). The functions performed by the feature correlation engine(s) 408 further provide a technical solution to a technical problem in that they are able to detect correlations between clients and peers that are undetectable to manual human methods at the processing rates achieved by the system.

Figure 5:
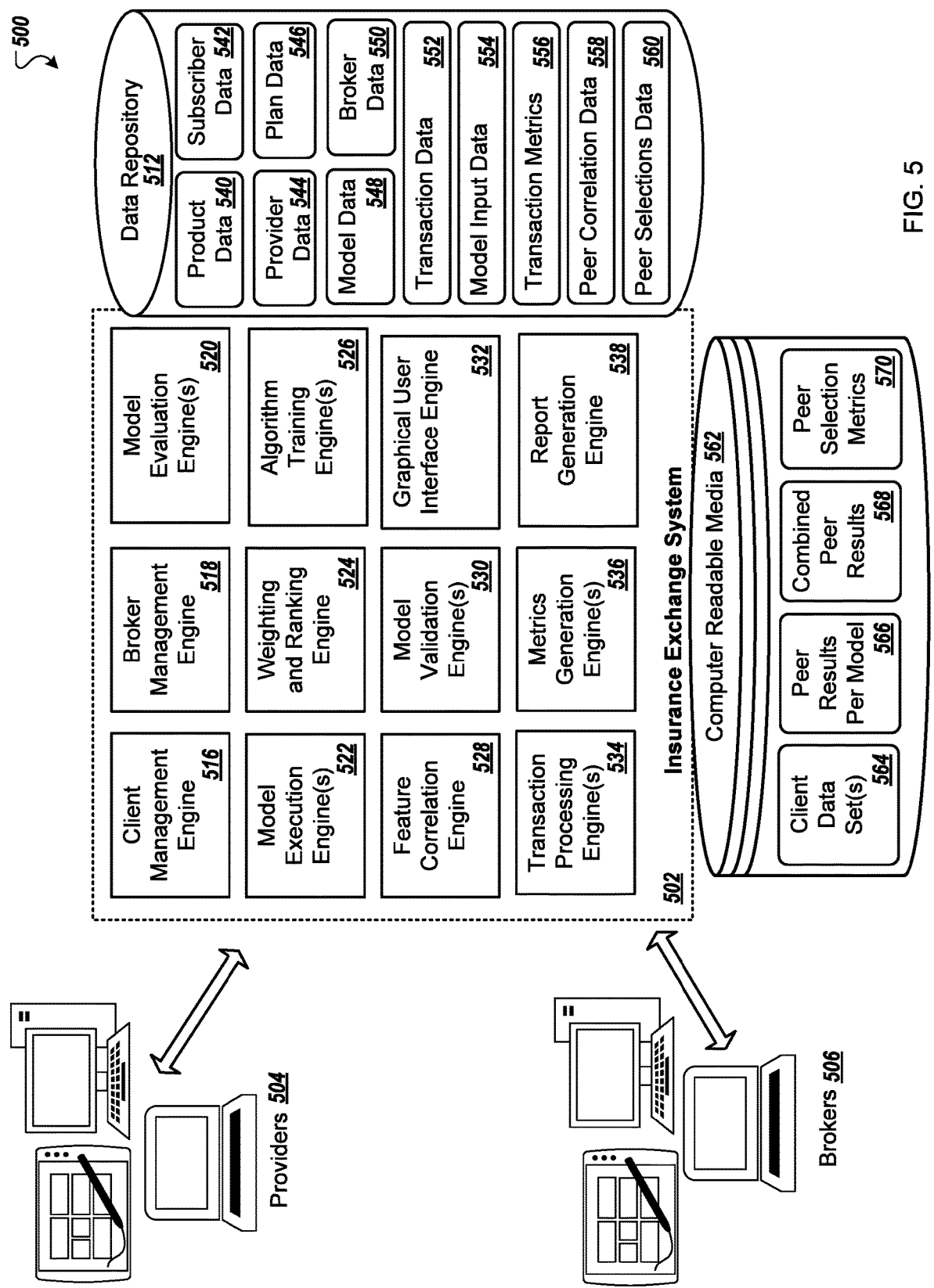
FIG. 5 is a block diagram of an example environment for managing transactions involving providers, subscribers, and brokers of insurance products.

FIG. 5 illustrates a block diagram of an example environment 500 for identifying peer relationships within an insurance exchange system 502. The environment 500 includes a number of providers (e.g., clients) 504, such as insurance providers, as well as a number of brokers 506, such as insurance brokers. The clients 504 and brokers 506 may access the insurance exchange system 502 using a variety of computing devices, as illustrated.

In some implementations, the insurance exchange system 502 includes a data repository 512 housing information for use by a number of engines 516 through 538 of the insurance exchange system 502. The data repository 512 may include one or more non-transitory computer readable medium, for example within one or more database resources or other data repositories of the environment 500.

The insurance exchange system 502, in some implementations, includes a client management engine 516 for managing client information. The client management engine 516, for example, may collect and score characteristics regarding clients of the insurance exchange system 502 (e.g., clients that have purchased products through one or more of the brokers 506). Further, in some implementations, the client management engine 516 may obtain and store metrics regarding clients 516, such as claims metrics or relationship metrics with the brokers 506 and/or providers 504. The metrics, for example, may be calculated by one or more metrics generation engine(s) 536. In some examples, the metrics may include products purchased by each client (e.g., identified by product data 540 and/or plan data 546) including exposure, premium, limit, and deductible of a layered or tiered product. The metrics may further include metrics derived through insurance claims submitted through the insurance exchange system 502 (e.g., as received through one or more transaction processing engines 534). The client management engine 516, for example, may manage subscriber data 542 stored in the data repository 512.

In some implementations, the insurance exchange system 502 includes a broker management engine 518 for managing broker information on behalf of the brokers 506, such as the broker data 550 of the data repository 512 and the peer selections data 560. The broker data 506, for example, may include characteristics and login information regarding the brokers 506. The peer selections data 560 may include an audit history of selections each broker 506 made in identifying peer enterprises to a particular client (e.g., subscriber identified via subscriber data 542). The peer selections data 560, for example, may be gathered by a GUI engine 532 in obtaining user inputs from brokers 506 via the user interface 330 of FIG. 3B.

The insurance exchange system 502, in some implementations, includes one or more model evaluation engine(s) 520 for evaluating known information regarding a client and matching that information with one or more appropriate models for peer identification. The model evaluation engine(s) 520 may identify availability of client characteristics, for example obtained through the subscriber data 542 and/or the GUI engine 532 (e.g., submitted by one of the brokers 506 in relation to the request for peer analytics), matching model input data 554 of the data repository 512 required by one or more model execution engine(s) 522. Further, the model evaluation engine(s) 520 may identify availability of client metrics, for example obtained through transaction metrics data 556 of the data repository 512 and/or otherwise generated by metrics generation engine(s), matching model input data 554 required by one or more model execution engine(s) 522. In some embodiments, a one-to-one matching exists between the model evaluation engine(s) 520 and the model execution engine(s) 522, such that a given model evaluation engine 520 executes as a precursor to launching the corresponding model execution engine 522 to identify peers to the identified client. The model evaluation engine(s) 520, for example, may execute a portion of the process 100 of FIG. 1A (e.g., related to the model evaluation engine 104) and/or the method 200 of FIG. 2A. The output of the one or more model evaluation engine(s) 520 may include one or more client data sets containing client characteristics and/or metrics for use as input data to the model execution engine(s) 522. One or more client data sets 564 output by the model evaluation engine(s) 520, for example, may be stored in a computer readable media 562 for access by other engines of the insurance exchange system 502, such as the model execution engine(s) 522. In some examples, for each requestor, the model evaluation engine 520 generates a client data set for each of the models where each data set is customized to the respective model and includes features that are uniquely associated to the particular model.

In some implementations, the insurance exchange system 502 includes the one or more model execution engines 522 for performing peer analysis regarding a client. The model execution engine(s) 522 may be designed to identify peer enterprises to a client enterprise based upon characteristics obtained through the subscriber data 542 and/or the GUI engine 532. Further, the model execution engine(s) 522 may be designed to identify peer enterprises to a client enterprise based upon transaction metrics 556 related to subscribers. The model execution engine(s) 522 may each accept, for example, certain model inputs (e.g., subscriber characteristics and/or metrics) identified by the model evaluation engine(s) 520. The model execution engine(s) 522 may apply model data 548 (e.g., training data) in developing one or more models to accurately identify peers of a subscriber based upon the characteristics and/or metrics. The model execution engine(s) 522, for example, may execute at least a portion of the process 100 of FIG. 1A (e.g., that of the model execution engine(s) 110) and/or the method 200 of FIG. 2A. Each model may provide a set of peer results 566 to the computer readable media 562 for access by other engines of the insurance exchange system 502, such as a weighting and ranking engine 524.

In some implementations, the weighting and ranking engine 524 obtains identified peers from the model execution engine(s) 522, combines the outputs from the multiple model execution engines 522 if two or more models were used, and arranges the results in a priority order. In determining prioritization of the results, in some embodiments, the weighting and ranking engine 524 accesses peer selections data 560 of the data repository 512 to identify whether an archive of previously identified peers of the subject client is available. For example, organizations previously identified as peers of the client may be promoted by the weighting and ranking engine 524. The weighting and ranking engine 524, for example, may perform at least a portion of the process 100 of FIG. 1B (e.g., related to the weighting and ranking engine 120). The weighting and ranking engine 524, for example, may perform at least a portion of the method 230 of FIG. 2B. Combined peer results 568 created by the weighting and ranking engine 524, in some embodiments, are placed in the computer readable media 562 for access by other engines of the insurance exchange system, such as a graphical user interface (GUI) engine 532.

The GUI engine 532, in some implementations, receives a request from one of the brokers 506 for peer comparison metrics for an identified client and responds with presenting peer results for broker review. In other implementations where selection of the set of peers is fully automated, the GUI engine 532 responds to the broker's request for peer metrics with a presentation of comparison metrics. The request for peer metrics may be placed via a user interface previously supplied by the GUI engine 532 to the broker 506 via a network. At least a portion of the brokers 506 may communicate with the insurance exchange system 502 through a web interface such as a web browser such that the request is provided through the browser interface. At least a portion of the brokers 506 interface with the insurance exchange system 502 via a network portal, for example using a software package provided by the insurance exchange system, such that the request is provided through the portal connection to the insurance exchange system 502.

If the identified client has purchased one or more products 540 through the insurance exchange system 502, the subscriber data 542 may contain characteristics of the client. Otherwise, in the event that the client is a prospective client identified by the broker 506, the broker 506 may enter information regarding the client through a user interface provided by the GUI engine 532 (e.g., such as the user interface 300 of FIG. 3, through selection of the prospect control 312). In further embodiments, a query engine (not shown) may access prospective client information from one or more databases of corporate statistics (e.g., locally collected or accessed on the fly through a web query to a web site hosting such information). The characteristics, in some examples, may include size (e.g., number of employees), financial position (e.g., market share, gross operating profit (GOP), sales volume, etc.), region (e.g., country, province, state, city, etc.), industry, and/or maturity (e.g., years since incorporation).

The GUI engine 532, in some embodiments, supplies the request information to the model evaluation engine 520 to initiate the internal peer identification process of the insurance exchange system 502. If submitted by the broker 506 through the GUI engine 532, the GUI engine 532 may further supply at least a portion of the client characteristics.

In implementations where peer results are presented for broker review, the GUI engine 532 may receive combined peer results 568, for example as generated by the weighting and ranking engine 524. The GUI engine 532 may prepare a user interface listing the combined peer results 568 for presentation to the broker 506 (e.g., through the web browser or portal as discussed above). The user interface, for example, may be the user interface 330 of FIG. 3B. The user interface provided by the GUI engine 532 may identify each peer along with a number of peer characteristics and/or metrics. Further, the user interface may allow the broker 506 to sort and/or filter the information based upon each of the characteristics and/or metrics. By default, in an illustrative example, the peers may be presented in the priority order identified by the weighting and ranking engine 524.

In some implementations, the GUI engine 532 further receives broker selections of a portion of the identified peers. The broker selections, for example, may be added to the peer selections data 560 for later use. In some embodiments, the broker selections are stored along with at least a portion of the present characteristics and/or metrics of each peer organization. For example, peers may be identified based upon characteristics and/or metrics that may change over time, such that a peer may be less relevant in the future. As such, peer selections data 560 may be linked to present characteristics and/or metrics so that one or more model validation engines 404 may analyze the information to identify trends in the characteristics and/or metrics which appear to lead to selection.

In some implementations, the GUI engine 532 supplies the broker selected peers to one or more of the metrics generation engines 536. Using the selected peers, for example, the metrics generation engine(s) 536 may discern aggregate metrics regarding the peers. For example, the set of peers selected by the broker 506 may be de-identified through combining the individual metrics into a representative "peer metric" for each of a number of metric data values. The aggregate metrics may be presented to the user through a subsequent user interface presentation generated by the GUI engine 532.

In some implementations, the model validation engine(s) 530 analyze the peer selections made by the broker 506 to validate the ranking and/or rating of the peers within each model's set of peer results (e.g., as applied by the model execution engines 522). Each model validation engine 530 may correspond with a particular model execution engine 522. The peer selections, as discussed above, may be stored as peer selections data 560 for later validation. In some embodiments, the model validation engine(s) 530 are executed periodically upon accumulated peer selections data 560 to gauge effectiveness of each model in identifying appropriate peer organizations. For example, the model validation engine(s) may be executed on a scheduled basis (e.g., every week, every month, etc.), on a volume basis (e.g., after X number of records of peer selection data have been collected or after Y requests by the brokers 506 for peer identification). The model validation engine(s) 530 may determine one or more metrics to compare the peer predictions with peer selections made by users, including user-entered peers not proposed within the predicted peers. Percentile match predicted for each selected peer, for example, may be analyzed to confirm relevancy of the prediction algorithm(s). The metrics, in some examples, may include an average or mean deviation from anticipated match to actual match results, a percentage selection of peer results in a threshold percentile of peer results presented (e.g., top 10%, top quartile, etc.), and/or prevalence of selection of peer results from each of a set of percentile tiers of match confidences. The model validation engine(s) 530 may perform one or more operations of the process 400 of FIG. 4, such as the operations of the model validation engine(s) 404. The metrics generated by the model validation engine(s) 530, for example, may be stored as peer selection metrics 570 in the computer readable media 562 for sharing with other engines of the insurance exchange system 502, such as a report generation engine 538.

In some embodiments, where the peer selections data 560 includes one or more peer additions of enterprises not identified within the peer results presented to the broker 506, the model validation engine(s) 530 may identify a commonality of additions to the peer selections outside of the recommendations provided through application of one or more models. For example, the GUI engine 532 may include an entry field for entering a new peer in addition to selecting from the recommended peers.

In some embodiments where the brokers 506 are provided the opportunity to select between available models and/or to weight or otherwise promote results obtained through a particular model or model type, the model validation engine(s) 530 may calculate metrics expressing propensity for selecting peers from the promoted model/model type versus selecting peers from the demoted model/model type. For example, the peer selections data 560, in addition to containing peer identifications and weights applied to various models, may also include an indication of whether the model or model type was demoted (or another model of the same time de-selected, etc.). In an illustrative example, the model validation engine(s) 530 may calculate the percentage of selections made from results obtained from a promoted (in priority or weight) model or model type and percentage of selections made from results obtained from a demoted (in priority or weight) model or model type.

In some embodiments, the model validation engine(s) 530 generate additional training data (e.g., derived from the peer selections data 560) for training the model execution engine(s) 522. For example, the model validation engine(s) 530 may supply training data to the model data 548.

In some implementations, the report generation engine 538 generates one or more reports presenting the metrics generated by the model validation engine(s) 530. The report generation engine 538, for example, may combine the peer selection metrics 570 into tables, graphs, and other comparison illustrations to demonstrate performance of the various model execution engine(s) based upon the peer selections data 560. In some embodiments, the report generation engine 538 combines the peer selection metrics 570 with additional metrics, for example generated by the metrics generation engine(s) 536. The additional metrics, in some examples, may include frequency data of model selection of the various models used by the model execution engine(s) 522, frequency data of model weighting of the various models used by the model execution engine(s) 522, and/or frequency data of peer entry by the brokers 506 of peer organizations not identified within the combined peer results 568.

In some implementations, a feature correlation engine 528 of the insurance exchange system 502 analyzes the peer selections data 560 to identify feature correlations (e.g., peer characteristics and/or metrics) evidenced in the peer selections data 560. For example, the feature correlation engine 528 may statistically analyze selections in light of additional feature data (e.g., characteristics and/or metrics of the organizations identified within the peer selections data 560). The feature data, for example, may be derived from the subscriber data 542 and/or transaction data 552 (e.g., as evidencing subscriber purchase of products and/or plans identified within the product data 540, or plan data 546). In some embodiments, the feature data may be derived in part through accessing additional characteristics and/or metrics from external sources. For example, the feature correlation engine 528 may analyze characteristics and/or metrics regarding at least a portion of the organizations identified within the peer selections data 560 from public sources such as business information web sites or data bases. The feature correlation engine 528, in some embodiments, proposes one or more new groupings of characteristics and/or metrics for defining one or more new models for addition to the insurance exchange system 502 as model execution engines 522.

Figure 6:
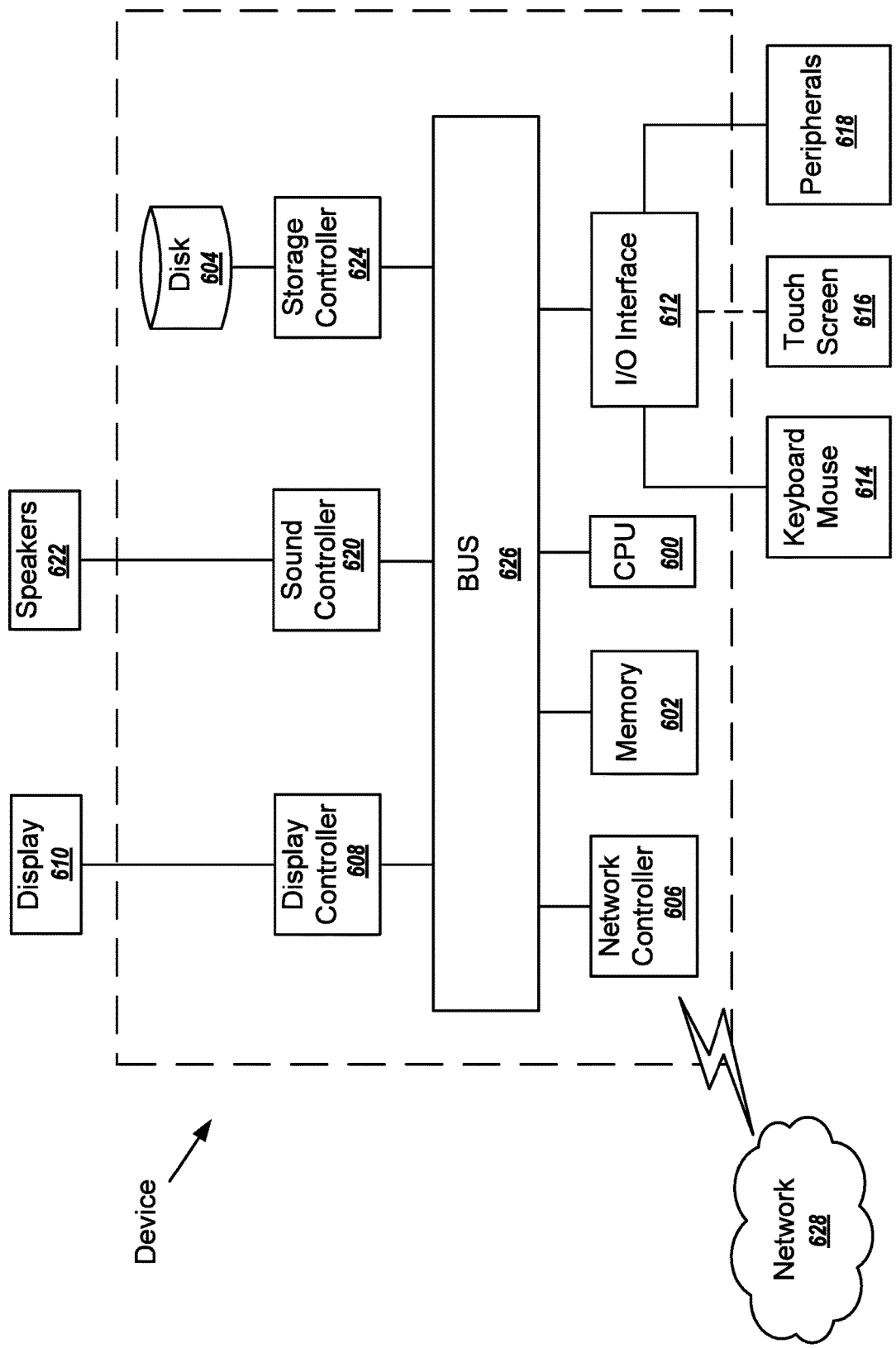
FIG. 6 is a block diagram of an example computing device.

Next, a hardware description of the computing device, mobile computing device, or server according to exemplary embodiments is described with reference to FIG. 6. The computing device, for example, may represent the providers 504, brokers 506 and/or computing systems of the insurance exchange system 502 of FIG. 5. In FIG. 6, the computing device, mobile computing device, or server includes a CPU 600 which performs the processes described above. The process data and instructions may be stored in memory 602. The processing circuitry and stored instructions may enable the computing device to perform, in some examples, the operational flow 100 of FIGS. 1A and 1B, the method 200 of FIG. 2A, the method 230 of FIG. 2B, or the operational flow 400 of FIG. 4. These processes and instructions may also be stored on a storage medium disk 604 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device, mobile computing device, or server communicates, such as a server or computer. The storage medium disk 604, in some examples, may store the contents of the storage 106, 112*a*, 112*b*, 114, and/or 118 of FIG. 1A, storage 410 of FIG. 4, and/or data repository 512 or computer readable media 562 of FIG. 5.

Further, a portion of the claimed advancements may be provided as a utility application, background daemon, or component of an operating system, or combination thereof, executing in conjunction with CPU 600 and an operating system such as Microsoft Windows 10, UNIX, Solaris, LINUX, Apple MAC-OS and other systems known to those skilled in the art.

CPU 600 may be a Xenon or Core processor from Intel of America or an Opteron processor from AMD of America, or may be other processor types that would be recognized by one of ordinary skill in the art. Alternatively, the CPU 600 may be implemented on an FPGA, ASIC, PLD or using discrete logic circuits, as one of ordinary skill in the art would recognize. Further, CPU 600 may be implemented as multiple processors cooperatively working in parallel to perform the instructions of the inventive processes described above.

The computing device, mobile computing device, or server in FIG. 6 also includes a network controller 606, such as an Intel Ethernet PRO network interface card from Intel Corporation of America, for interfacing with network 628. As can be appreciated, the network 628 can be a public network, such as the Internet, or a private network such as an LAN or WAN network, or any combination thereof and can also include PSTN or ISDN sub-networks. The network 628 can also be wired, such as an Ethernet network, or can be wireless such as a cellular network including EDGE, 3G, 4G, and 5G wireless cellular systems. The wireless network can also be Wi-Fi, Bluetooth, or any other wireless form of communication that is known. The network 628, for example, may support communications between insurance exchange system 502 and any of the providers 504 and/or brokers 506 of FIG. 5.

The computing device, mobile computing device, or server further includes a display controller 608, such as a NVIDIA GeForce GTX or Quadro graphics adaptor from NVIDIA Corporation of America for interfacing with display 610, such as a Hewlett Packard HPL2445w LCD monitor. A general purpose I/O interface 612 interfaces with a keyboard and/or mouse 614 as well as a touch screen panel 616 on or separate from display 610. General purpose I/O interface also connects to a variety of peripherals 618 including printers and scanners, such as an OfficeJet or DeskJet from Hewlett Packard. The display controller 608 and display 610 may enable presentation of the user interfaces illustrated, in some examples, in FIGS. 3A and 3B.

A sound controller 620 is also provided in the computing device, mobile computing device, or server, such as Sound Blaster X-Fi Titanium from Creative, to interface with speakers/microphone 622 thereby providing sounds and/or music.

The general purpose storage controller 624 connects the storage medium disk 604 with communication bus 626, which may be an ISA, EISA, VESA, PCI, or similar, for interconnecting all of the components of the computing device, mobile computing device, or server. A description of the general features and functionality of the display 610, keyboard and/or mouse 614, as well as the display controller 608, storage controller 624, network controller 606, sound controller 620, and general purpose I/O interface 612 is omitted herein for brevity as these features are known.

One or more processors can be utilized to implement various functions and/or algorithms described herein, unless explicitly stated otherwise. Additionally, any functions and/or algorithms described herein, unless explicitly stated otherwise, can be performed upon one or more virtual processors, for example on one or more physical computing systems such as a computer farm or a cloud drive.

Reference has been made to flowchart illustrations and block diagrams of methods, systems and computer program products according to implementations of this disclosure. Aspects thereof are implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 7:
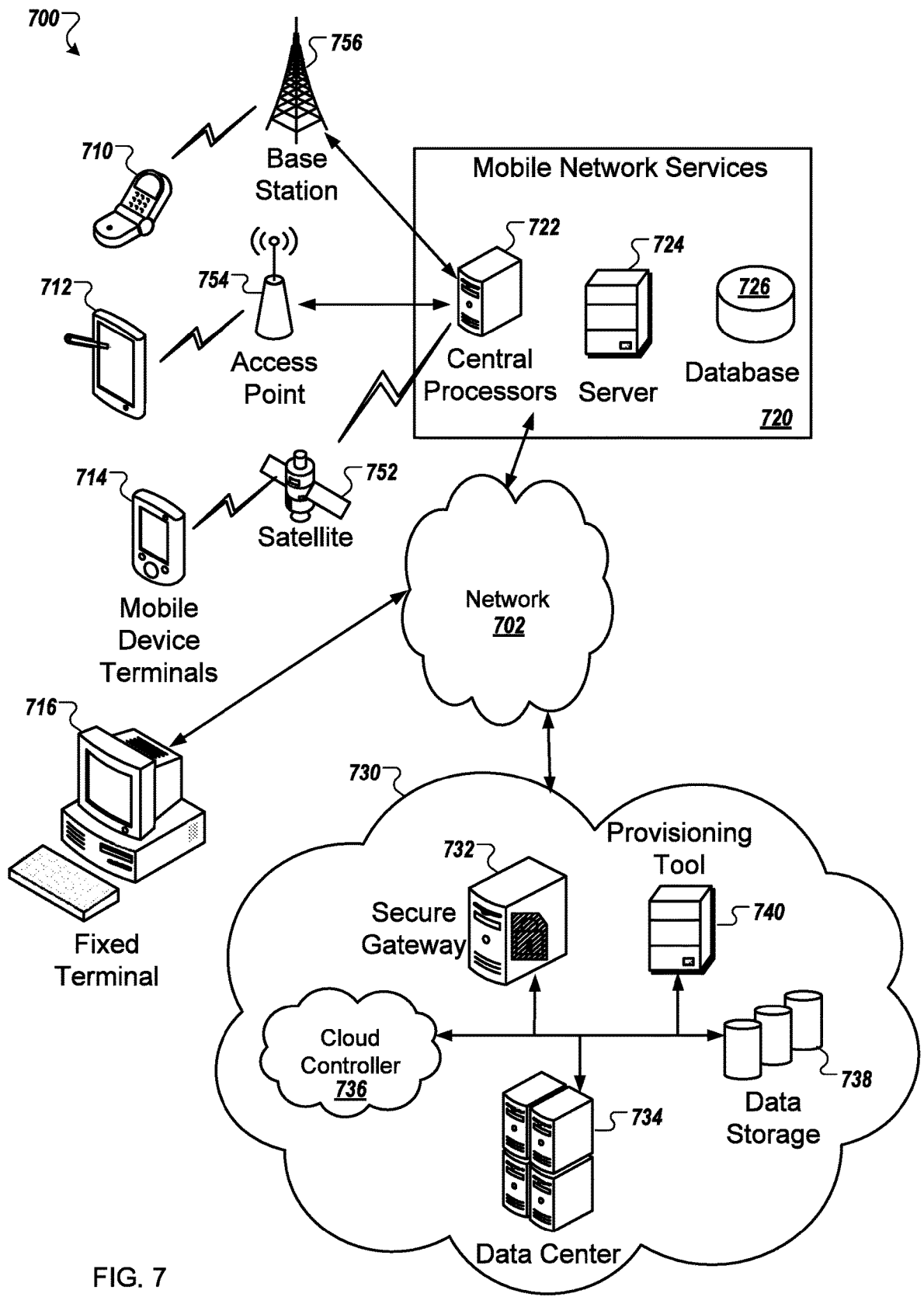
FIG. 7 is a block diagram of an example networking environment.

The functions and features described herein may also be executed by various distributed components of a system. For example, one or more processors may execute these system functions, wherein the processors are distributed across multiple components communicating in a network. The distributed components may include one or more client and server machines, which may share processing, as shown on FIG. 7, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

In some implementations, the described herein may interface with a cloud computing environment 730, such as Google Cloud Platform™ to perform at least portions of methods or algorithms detailed above. The processes associated with the methods described herein can be executed on a computation processor, such as the Google Compute Engine by data center 734. The data center 734, for example, can also include an application processor, such as the Google App Engine, that can be used as the interface with the systems described herein to receive data and output corresponding information. The cloud computing environment 730 may also include one or more databases 738 or other data storage, such as cloud storage and a query database. In some implementations, the cloud storage database 738, such as the Google Cloud Storage, may store processed and unprocessed data supplied by systems described herein. For example, the client characteristics and/or metrics 106, model inputs 112a, model data 112b, peer characteristics and/or metrics 114, and/or peer results 116 of FIG. 1A may be maintained in a database structure such as the databases 738. Similarly, the requestor historical selection(s) and/or priorities 122 of FIG. 1B and/or the entity characteristics and/or metrics 410 of FIG. 4 may be maintained in a database structure such as the databases 738. Further, the insurance exchange system 502 of FIG. 5 may maintain any of the product data 540, subscriber data 542, provider data 544, plan data 546, model data 548, broker data 550, transaction data 552, model input data 554, transaction metrics 556, peer correlation data 558, peer selections data 560, client data set(s) 564, peer results 566 combined peer results 568, and peer selection metrics 570 in a database structure such as the databases 738.

The systems described herein may communicate with the cloud computing environment 730 through a secure gateway 732. In some implementations, the secure gateway 732 includes a database querying interface, such as the Google BigQuery platform. The data querying interface, for example, may support access by the insurance exchange system to data stored on any one of the providers 504 and the brokers 506, as well as the data repository 512 and computer readable media 562.

The cloud computing environment 730 may include a provisioning tool 740 for resource management. The provisioning tool 740 may be connected to the computing devices of a data center 734 to facilitate the provision of computing resources of the data center 734. The provisioning tool 740 may receive a request for a computing resource via the secure gateway 732 or a cloud controller 736. The provisioning tool 740 may facilitate a connection to a particular computing device of the data center 734.

A network 702 represents one or more networks, such as the Internet, connecting the cloud environment 730 to a number of client devices such as, in some examples, a cellular telephone 710, a tablet computer 712, a mobile computing device 714, and a desktop computing device 716. The network 702 can also communicate via wireless networks using a variety of mobile network services 720 such as Wi-Fi, Bluetooth, cellular networks including EDGE, 3G, 4G, and 5G wireless cellular systems, or any other wireless form of communication that is known. In some examples, the wireless network services 720 may include central processors 722, servers 724, and databases 726. In some embodiments, the network 702 is agnostic to local interfaces and networks associated with the client devices to allow for integration of the local interfaces and networks configured to perform the processes described herein. Additionally, external devices such as the cellular telephone 710, tablet computer 712, and mobile computing device 714 may communicate with the mobile network services 720 via a base station 756, access point 754, and/or satellite 752.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "about," "proximate," "minor variation," and similar terms generally refer to ranges that include the identified value within a margin of 20%, 10% or preferably 5% in certain embodiments, and any values therebetween.

All of the functionalities described in connection with one embodiment are intended to be applicable to the additional embodiments described below except where expressly stated or where the feature or function is incompatible with the additional embodiments. For example, where a given feature or function is expressly described in connection with one embodiment but not expressly mentioned in connection with an alternative embodiment, it should be understood that the inventors intend that that feature or function may be deployed, utilized or implemented in connection with the alternative embodiment unless the feature or function is incompatible with the alternative embodiment.

While certain embodiments have been described, these embodiments have been presented by way of example only and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. A system for automatically identifying peer organizations of a subject organization within a transactional platform, the system comprising:
   processing circuitry; and
   a non-transitory computer readable medium having instructions stored thereon, wherein the instructions, when executed by the processing circuitry, cause the processing circuitry to:
   receive, via a network from a remote computing device of a user, a request for peer comparison with the subject organization,
   in real time responsive to receiving the request, identify a plurality of peer organizations of the subject organization, wherein identifying the plurality of peer organizations comprises
   determining a plurality of features of the subject organization, wherein the plurality of features comprises i) one or more characteristic features of the subject organization including at least one of industry or region and ii) one or more transactional features of the subject organization, generating, from the plurality of features of the subject organization, one or more organization data sets, each organization data set comprising at least a portion of the one or more characteristic features and/or at least a portion of the one or more transactional features of the subject organization, wherein each of the one or more organization data sets is customized to features used to train a respective model of one or more models, wherein each model of the one or more models is trained to detect similarities between a given organization and a plurality of other organizations according to the features in the respective organization data set, for each of the one or more organization data sets, obtaining, through executing the respective organization data set on the corresponding model of the one or more models trained using the features of the respective organization data set, a plurality of candidate organizations of the plurality of other organizations sharing one or more similarities with the subject organization according to the features of the respective organization data set, and selecting, from the plurality of candidate organizations to each organization data set of the one or more organization data sets, the plurality of peer organizations, prepare, for presentation at the remote computing device, a graphical user interface for presenting at least a portion of the plurality of peer organizations, wherein, for each peer of the portion of the plurality of peer organizations, the respective peer is represented along with i) at least a portion of the plurality of peer features of the respective peer within the graphical user interface and ii) a control for selecting the respective peer for use in comparison metrics, receive, via the graphical user interface, indication of a set of peer organizations selected from the portion of the portion of the plurality of peer organizations, and analyze the set of peer organizations in view of the subject organization to determine one or more features of the plurality of features correlating between the subject organization and the set of peer organizations for use in training an additional model of the one or more models, wherein the one or more organization data sets lack the one or more features.

2. The system of claim 1, wherein determining the plurality of features comprises identifying one or more missing features, each missing feature corresponding to at least one organization data set of the one or more organization data sets.

3. The system of claim 2, wherein generating the one or more organization data sets comprises filtering out each data set of the at least one organization data set from consideration for application to the corresponding model of the one or more models.

4. The system of claim 2, wherein determining the plurality of features comprises obtaining, from the remote device of the user via the network, the one or more missing features.

5. The system of claim 2, wherein determining the plurality of features comprises calculating, for each of the one or more missing features, an approximated value for the respective missing feature.

6. The system of claim 1, wherein the one or more models include at least one of a k-nearest neighbors (KNN) clustering model, a business lines similarity (BLS) model, or a program structure similarity (PSS) model.

7. The system of claim 6, wherein, for the KNN clustering model, executing the respective organization data set on the corresponding model of the one or more models trained using the features of the respective organization data set includes calculating a distance between a first feature vector representing the respective organization data set and a plurality of second feature vectors each representing one of the plurality peer organizations, wherein the distance between the first feature vector and each of the plurality of second feature vectors represents an amount of similarity between the subject organization and the respective peer organization associated with the respective second feature vector.

8. The system of claim 1, wherein selecting the plurality of peer organizations comprises:

arranging the plurality of peer organizations in a priority order, wherein the priority order is determined based in part on identified commonalities in the respective portion of the plurality of candidate organizations output from each of the one or more models; and identifying, for each peer organization of the plurality of peer organizations, a plurality of peer features of the respective peer organization.

9. The system of claim 8, wherein arranging the plurality of peer organizations in the priority order comprises promoting a position of at least one of the portion of the plurality of peer organizations, wherein each organization of the at least one of the portion of the plurality of peer organizations is included in the respective plurality of candidate organizations of at least two models of the one or more models.

10. The system of claim 1, wherein the instructions, when executed by the processing circuitry, cause the processing circuitry to:

receive, from the remote computing device via the graphical user interface, selections of one or more peer organizations of the portion of the plurality of peer organizations for comparison to the subject organization; and update, responsive to receiving the selections, the respective training data sets for each of the one or more models.

11. The system of claim 1, wherein:

the subject organization is an insurance provider; and the peer comparison provides a comparison of coverage levels between the subject organization and the plurality of peer organizations.

12. A method for automatically identifying peer entities of a subject entity within a transactional platform, the method comprising:

receiving, by processing circuitry via a network from a remote computing device of a user, a request for peer comparison with the subject entity;

in real time responsive to receiving the request, identifying, by the processing circuitry, a plurality of peer entities of the subject entity, wherein identifying the plurality of peer entities comprises determining a plurality of features of the subject entity, wherein the plurality of features comprises i) one or more characteristic features of the subject entity including at least one of industry or region and ii) one or more transactional features of the subject entity, generating, from the plurality of features of the subject entity, one or more entity data sets, each entity data set comprising at least a portion of the one or more characteristic features and/or at least a portion of the one or more transactional features of the subject entity,
  wherein each of the one or more entity data sets comprises features used to train a respective model of one or more models, wherein
    each model of the one or more models is trained to detect similarities between a given entity and a plurality of other entities according to the features in the respective entity data set, and
    each data set of the one or more entity data sets represents feature correlations identified through analyzing the plurality of features of identified groups of peer entities for commonalities,
  for each of the one or more entity data sets
    obtaining, through executing the respective entity data set on the corresponding model of the one or more models trained using the features of the respective entity data set, a plurality of candidate entities sharing one or more similarities with the subject entity according to the features of the respective organization data set, and
    selecting, from the plurality of candidate entities to each entity data set of the one or more entity data sets, the plurality of peer entities; and
preparing, by the processing circuitry for presentation at the remote computing device, a graphical user interface for presenting at least a portion of the plurality of peer entities, wherein, for each peer of the plurality of peer entities, the respective peer is represented along with i) at least a portion of the plurality of peer features of the respective entity within the graphical user interface and ii) a control for selecting the respective peer for use in comparison metrics.

13. The method of claim 12, wherein the one or more models include at least one of a k-nearest neighbors (KNN) clustering model, a business lines similarity (BLS) model, or a program structure similarity (PSS) model.

14. The method of claim 12, wherein, preparing the graphical user interface comprises:
  arranging the portion of the plurality of peer entities in a priority order, wherein the priority order is determined based on an amount of similarity between the subject entity and each of the portion of the plurality of peer entities; and
  identifying, for each peer entity of the portion of the plurality of peer entities, a plurality of peer features of the respective peer entity.

15. The method of claim 14, wherein the priority order of the portion of the plurality of peer entities is determined based in part on identified commonalities in the respective plurality of candidate organizations output from each of the one or more models.

16. The method of claim 15, wherein determining the priority order of the portion of the plurality of peer entities includes promoting a position of a portion of the plurality of peer entities, wherein each organization of the portion of the plurality of peer organizations is included in the respective plurality of candidate organizations of at least two models of the one or more models.

17. The method of claim 12, wherein:
  the subject entity is an insurance provider; and
  the peer comparison provides a comparison of coverage levels between the subject entity and the plurality of peer entities.

18. The method of claim 12, wherein determining the plurality of features comprises identifying one or more missing features, each missing feature of the plurality of features corresponding to at least one entity data set of the one or more entity data sets.

19. The method of claim 18, wherein generating the one or more entity data sets comprises filtering out each data set of the at least one data set from consideration for application to the corresponding model of the one or more models.

20. The method of claim 18, wherein determining the plurality of features comprises obtaining, from the remote device of the user via the network, the one or more missing features.

* * * * *